United States Patent
Ouchn (10) Patent No.: US 9,871,815 B2
(45) Date of Patent: Jan. 16, 2018

(54) METHOD AND SYSTEM FOR AUTOMATED COMPUTER VULNERABILITY TRACKING

(71) Applicant: Joseph Nabil Ouchn, Saint Georges (FR)

(72) Inventor: Joseph Nabil Ouchn, Saint Georges (FR)

(73) Assignee: Joseph Nabil Ouchn, Saint Georges (FR)

( * ) Notice: Subject to any disclaimer, the term of this patent is extended or adjusted under 35 U.S.C. 154(b) by 136 days.

(21) Appl. No.: 14/968,564

(22) Filed: Dec. 14, 2015

(65) Prior Publication Data

US 2017/0171236 A1    Jun. 15, 2017

(51) Int. Cl.
*H04L 29/06* (2006.01)
*G06F 17/30* (2006.01)

(52) U.S. Cl.
CPC .... *H04L 63/1433* (2013.01); *G06F 17/30923* (2013.01)

(58) Field of Classification Search
CPC ............. H04L 63/1433; H04L 63/1441; H04L 63/145; H04L 63/16; H04L 63/20; G06F 17/30923; G06F 21/577
USPC ................................ 726/22–26; 713/187–188
See application file for complete search history.

(56) References Cited

U.S. PATENT DOCUMENTS

| | | | | |
|---|---|---|---|---|
| 7,243,148 B2 * | 7/2007 | Keir | ...................... | G02B 5/3083 709/224 |
| 7,257,630 B2 * | 8/2007 | Cole | .................... | G02B 5/3083 709/224 |
| 7,370,345 B2 * | 5/2008 | Bardsley | ............... | G06F 21/577 726/11 |
| 7,386,883 B2 * | 6/2008 | Bardsley | ............... | G06F 21/577 705/51 |
| 8,135,823 B2 * | 3/2012 | Cole | .................... | G02B 5/3083 709/224 |
| 8,458,793 B2 * | 6/2013 | McKenna | ............... | G06F 21/55 709/224 |
| 2012/0185945 A1 * | 7/2012 | Andres | ................. | G06F 21/568 726/25 |

* cited by examiner

*Primary Examiner* — Hosuk Song
(74) *Attorney, Agent, or Firm* — Oppedahl Patent Law Firm LLC

(57) ABSTRACT

There is provided a method and system for tracking, compiling, and distributing information regarding computer vulnerabilities. The method and system involve identifying computer vulnerabilities and associated information from main internet sources. These computer vulnerabilities are then checked against a number of other secondary sources for additional information. The information from the main and secondary sources are compiled into a database detailing the computer vulnerabilities. The database entries are then converted into computer readable format and distributed via the internet.

11 Claims, 7 Drawing Sheets

METHOD AND SYSTEM FOR AUTOMATED COMPUTER VULNERABILITY TRACKING

BACKGROUND

Security analysts and researchers require vulnerability and defense information to advance security understanding and make decisions on applying security controls to computer system platforms and software. A number of libraries, checklists, and systems have been developed to attempt to address this need.

The National Vulnerability Database (NVD) is the U.S. government repository of standards based vulnerability management data which is compiled using the Security Content Automation Protocol (SCAP). SCAP is a method for using specific standards to enable automated vulnerability management, measurement, and policy compliance evaluation. Currently SCAP is in its second version which draws information from a number of other existing libraries including: CVE® (Common Vulnerability Exposure), CCE (Common Configuration Enumeration), CPE (Common Platform Enumeration), CVSS (Common Vulnerability Scoring System), XCCDF (The Extensible Configuration Checklist Description Format) and OVAL (Open Vulnerability Assessment Language).

The NVD includes a compilation of security checklists, security related software flaws, misconfigurations, product names, and impact metrics. This information is typically discontiguous, voluminous and requires extensive effort to search and correlate with other security information types or references. The chief problem is that each of the above vulnerability libraries focuses on a different aspect of defining the vulnerability or targeted system.

The CVE library is a public listing of known computer vulnerabilities which are given a rough description and assigned a unique identifier code to identify and categorize the vulnerability.

The CVSS score is an open industry standard for assessing the severity of a vulnerability to a computer system. The CVSS system assesses the vulnerability on a number of factors related to how the vulnerability operates in order to arrive at a generalized score of how severe a threat the vulnerability represents.

CPE is a structured naming scheme for IT systems, platforms, and packages. The CPE name can be used as a standardized source of information for enforcing IT management policies across a number of systems or devices.

CCE assigns unique entries to configuration guidance statements and configuration controls to improve workflow by facilitating fast and accurate correlation of known configuration issues.

XCCDF is a markup language that defines a set of rules for encoding documents in a format which is both human and machine-readable, in this case specifying security checklists, benchmarks and configuration documentation.

OVAL is a community standard to promote open and publicly available security content, and to standardize the transfer of this information across the entire spectrum of security tools and services. OVAL language standardizes the three main steps of the assessment process: representing configuration information of systems for testing; analyzing the system for the presence of the specified machine state (vulnerability, configuration, patch state, etc.); and reporting the results of this assessment.

FDCC (Federal Desktop Core Configuration) is a checklist for mandatory configuration settings on desktop and laptop computers owned by the United States government. The goal of FDCC compliance is to establish baseline security parameters and facilitate administrative tasks such as patch management.

CAPEC (Common Attack Pattern Enumeration and Classification) is to provide a publicly available catalog of common attack patterns classified in an intuitive manner, along with a comprehensive schema for describing related attacks and sharing information about them CWE (Common Weakness Enumeration) provides a unified, measurable set of software weaknesses that enables a more effective discussion, description, selection, and use of software security tools and services that can find these weaknesses in source code and operational systems as well as better understanding and management of software weaknesses related to architecture and design At present, a combination of the various SCAP references listed above are used to identify vulnerabilities and exposures and subscribe severity levels to assist analysts, researchers, developers, testers, and educators in making informed risk decisions. However, none of the above reference sources extensively incorporate third party vendor and technology community reference information in sufficient detail to enable an identification, prevention, or detection of vulnerabilities, as well as provide for implementation of appropriate preventive and reactive response controls. This third party information can be taken into account in combination with SCAP information sources to better inform the risk decision making process. Additional reference information includes, but is not limited to: endpoint protection, network intrusion detection, forensic indicators of compromise, compliance standards, security patches and fixes, system vulnerability assessments, exploitation techniques, and security configuration guides. An additional problem in incorporating information from these additional references sources is that these information sources may not be compatibly formatted according to an easy or common language, such as XCCDF.

Figure 1:
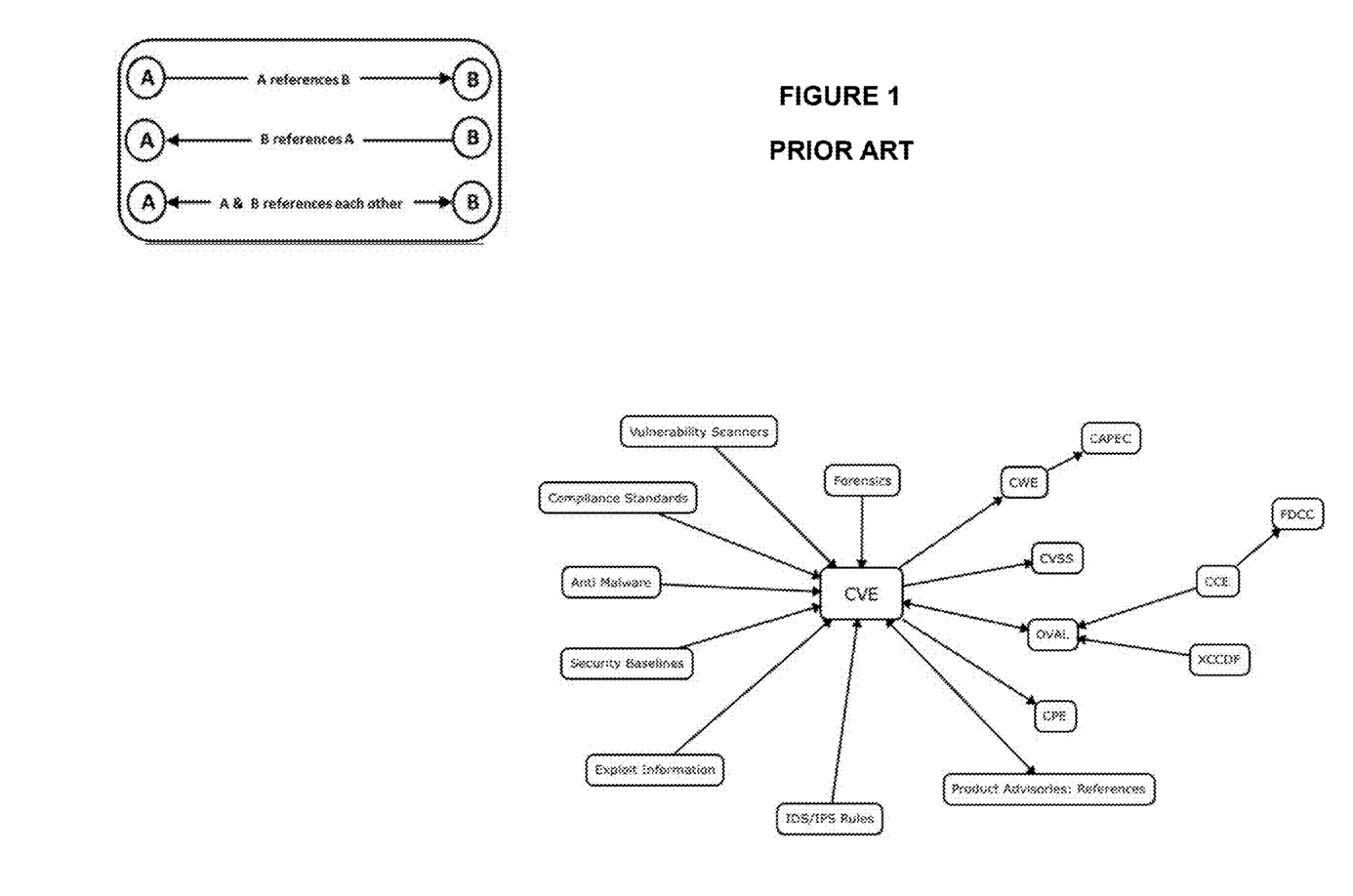
FIG. 1 is a block diagram describing the current relationships between the CVE library and other open vulnerability and exploit public sources, and their corresponding preventive, detective and responsive information sources.

As shown in FIG. 1, the central reference point for many of these different vulnerability and exposure information sources is the CVE library. In most cases these various information sources do not reference each other, or if they do, they only reference a limited set of the other available sources. In addition, methods of gathering and formatting this additional security reference information and combining it with the automated SCAP information is manual, unreliable and unstructured. Aggregating and correlating these various information sources to determine actionable risk decisions is laborious and prone to error. Further, the CVE library only reports a base risk score, determined by CVSS, in association with the identified CVE entry. This base score does not take into account other factors that could be used to understand the actual risk to a specific computer system. For example available patches vs zero-day not available patches, anti-malware detection signatures vs unavailable signatures, current ongoing global exploits vs exploits not yet seen. Further, the CVSS risk score does not factor in the use of announced third party compensating controls when assessing the likelihood of compromise. This lack of broader visibility from just CVE announcements obfuscates the true risk scoring for disclosed vulnerabilities and exploits.

The goal of the NVD is to enable the automation of vulnerability management, security measurement, and compliance for users. The NVD is publicly available and is formatted in a human and machine readable data display format known as XML. The security related software flaws contained within the NVD are represented within an XML document which is updated every two hours. Each of the vulnerabilities in the XML file includes a description and associated reference links from the CVE dictionary feed, as well as a CVSS score, vulnerable product configurations, and weakness categorization. The CVE unique vulnerability identifier is the reference point for any publicly disclosed vulnerability contained in the NVD XML. The NVD XML content is not exhaustive and does not contain additional detailed exposure information, their corresponding preventive, detection and response information. It requires its audience to obtain this information from third party sources.

The NVD XML vulnerability feed is organized by the first four digits of the CVE unique identifier "CVE-xxxx-xxxx". When referenced, this unique identifier serves only to identify the NVD entry for the vulnerability. As such, the unique identifier does not include or indicate the presence of any of the further information related to the additional corresponding preventive, detective and responsive information already gathered in the NVD system. As such, in order to determine the overall risk of the vulnerability to a given platform, a user must open the NVD entry and assess the third-party reference information manually.

In light of the shortcomings of the present systems and methods it is desirable to provide systems and methods which automatically compile all vulnerability and exposure information for computer platforms and software, including their corresponding prevention, detection, and response information into a single database. Further, it is advantageous for the systems and methods to output the information in simple format structure to accommodate automatic usage and review. Further, it is desirable to provide the information in a database in a form that can be easily correlated to display multilevel relationships between the vulnerability and the recorded prevention, detection, and response information. Finally, it is desirable for the vulnerability entries to be classified in a manner that readily distinguishes and identifies the elements of the vulnerability information.

SUMMARY OF THE INVENTION

In one embodiment, the invention provides a computer implemented method for tracking, compiling and distributing information regarding computer vulnerabilities. The method comprising: identifying, with a processor, one or more computer vulnerabilities from one or more internet main sources, and storing one or more types of main information regarding each of the one or more computer vulnerabilities; searching one or more internet secondary sources, with the processor, for one or more types of secondary information regarding each of the one or more computer vulnerabilities; compiling an electronic database cross-referencing each computer vulnerability with the main information and secondary information regarding that vulnerability; creating a computer readable file for each database entry which provides summary data regarding the main information and secondary information regarding that vulnerability; and distributing the electronic database via the internet.

In another embodiment, the invention provides a system for tracking, compiling, and distributing information regarding computer vulnerabilities. The system comprising: a processor and a memory storage. The processor identifies one or more computer vulnerabilities and one or more types of main information regarding each of the one or more computer vulnerabilities from one or more internet main sources, and searches one or more internet secondary sources, for one or more types of secondary information regarding each of the one or more vulnerabilities. The memory storage is for storing the identified vulnerabilities, the one or more types of main information, and the one or more types of secondary information. The storing of the identified vulnerabilities, the one or more types of main information, and the one or more types of secondary information consists of: compiling the identified vulnerabilities, one or more types of main information, and one or more types of secondary information in an electronic database with database entries cross-referencing each of the one or more computer vulnerabilities and the main information and secondary information regarding that vulnerability; and creating a computer readable file for each database entry which provides summary data regarding the main information and secondary information regarding that vulnerability. In addition, the processor distributes the electronic database via the internet.

BRIEF DESCRIPTION OF THE DRAWINGS

The present invention can be better understood through representations in the diagrams labelled and attached to this information package.

DETAILED DESCRIPTION

Figure 2:
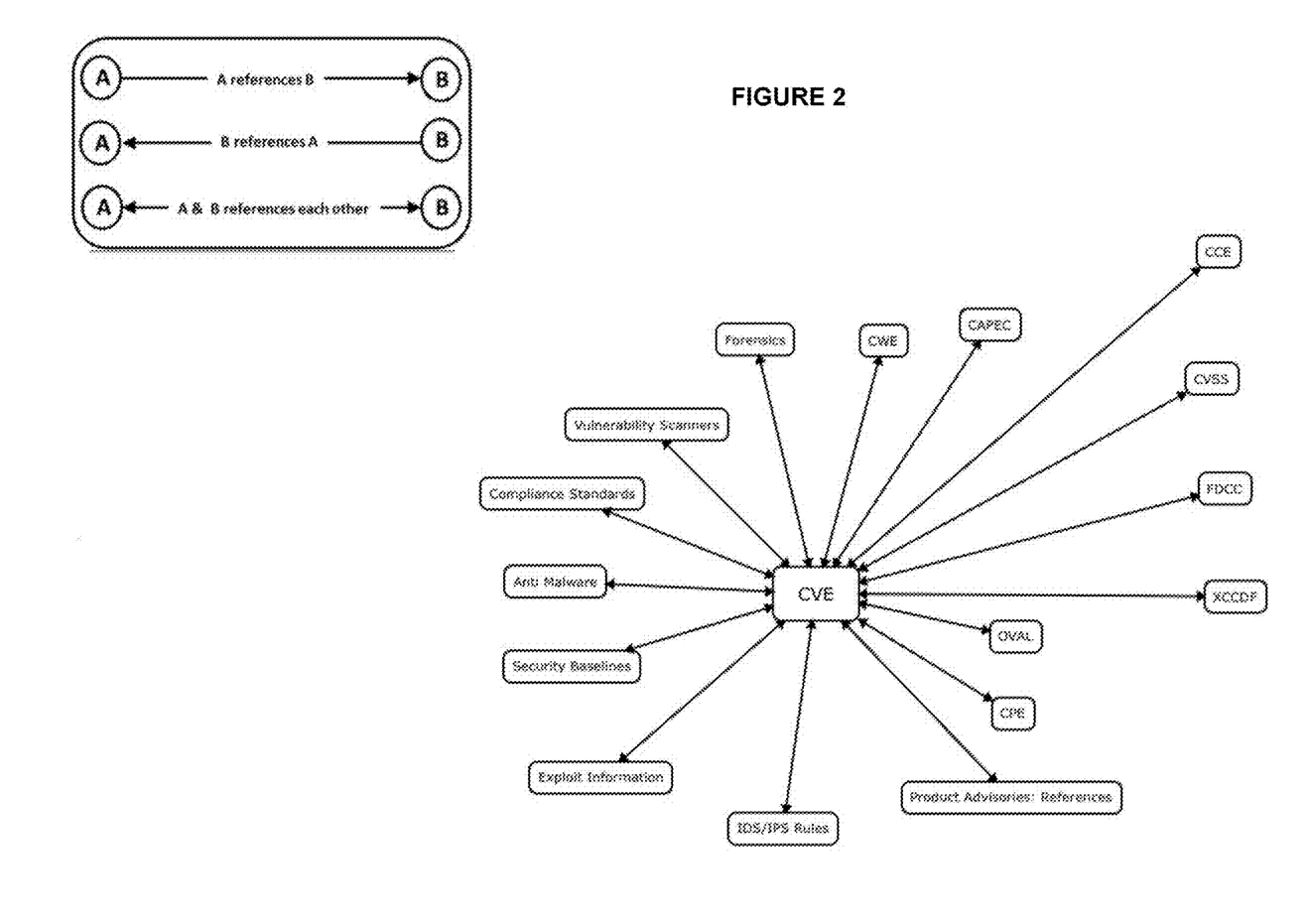
FIG. 2 is a block diagram describing the new relationships introduced by the invention between a CVE and other vulnerability and exploit sources, and their corresponding preventive, detective and responsive information sources.

The present invention provides an automated method, performed by a computer, for correlating and cross-referencing information from a number of vulnerability information sources with one another, as illustrated in FIG. 2. This allows for more accurate information and risk assessment regarding computer vulnerabilities. The method is performed by a computer system according to the embodiment depicted in FIG. 3. The system comprises three key components: a core engine (100); a mapper engine (200); and database(s) (300).

Figure 3:
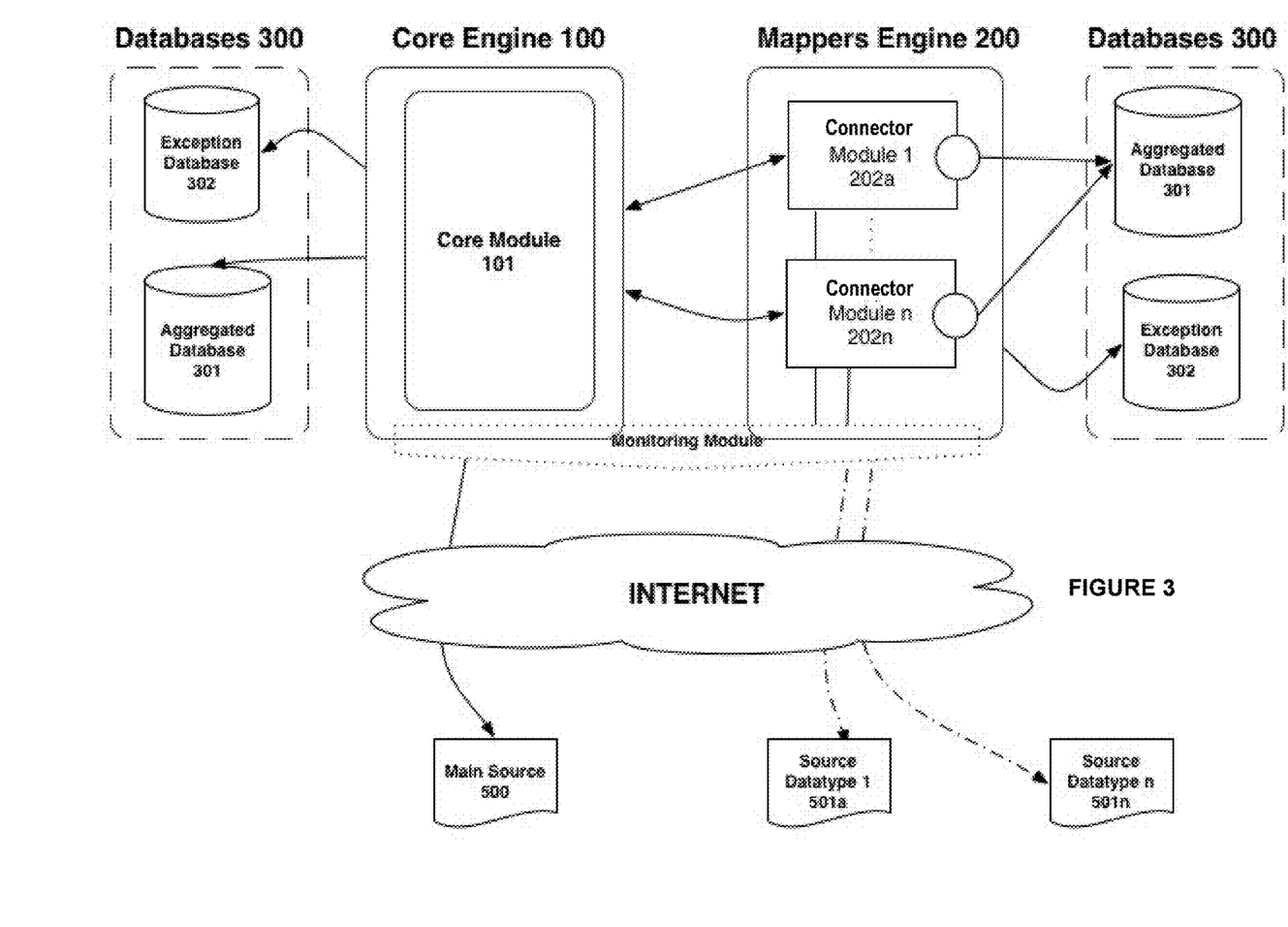
FIG. 3 is a block diagram describing the core of the invention. It shows the components of the invention which comprise the core engine and mapping engine, databases and data sources used in implementing the invention.

The core engine (100) is the central module of the invention. Its main feature is extraction of the basic attributes from main source references and population of the aggregated database (300) with the appropriate information. The core engine (100) comes with a subset of modules that range from generating statistics about database attributes, to checking for the environment integrity of the system. The core engine (100) coordinates interaction between the various modules and databases. In addition, the core engine (100) synchronizes the aggregation process of information sourced by the connector modules (202) in the mapper engine (200). This information is populated into a cross-linked aggregated database (301) to simplify the implementation and integration of new sources of data into the system.

Figure 4:
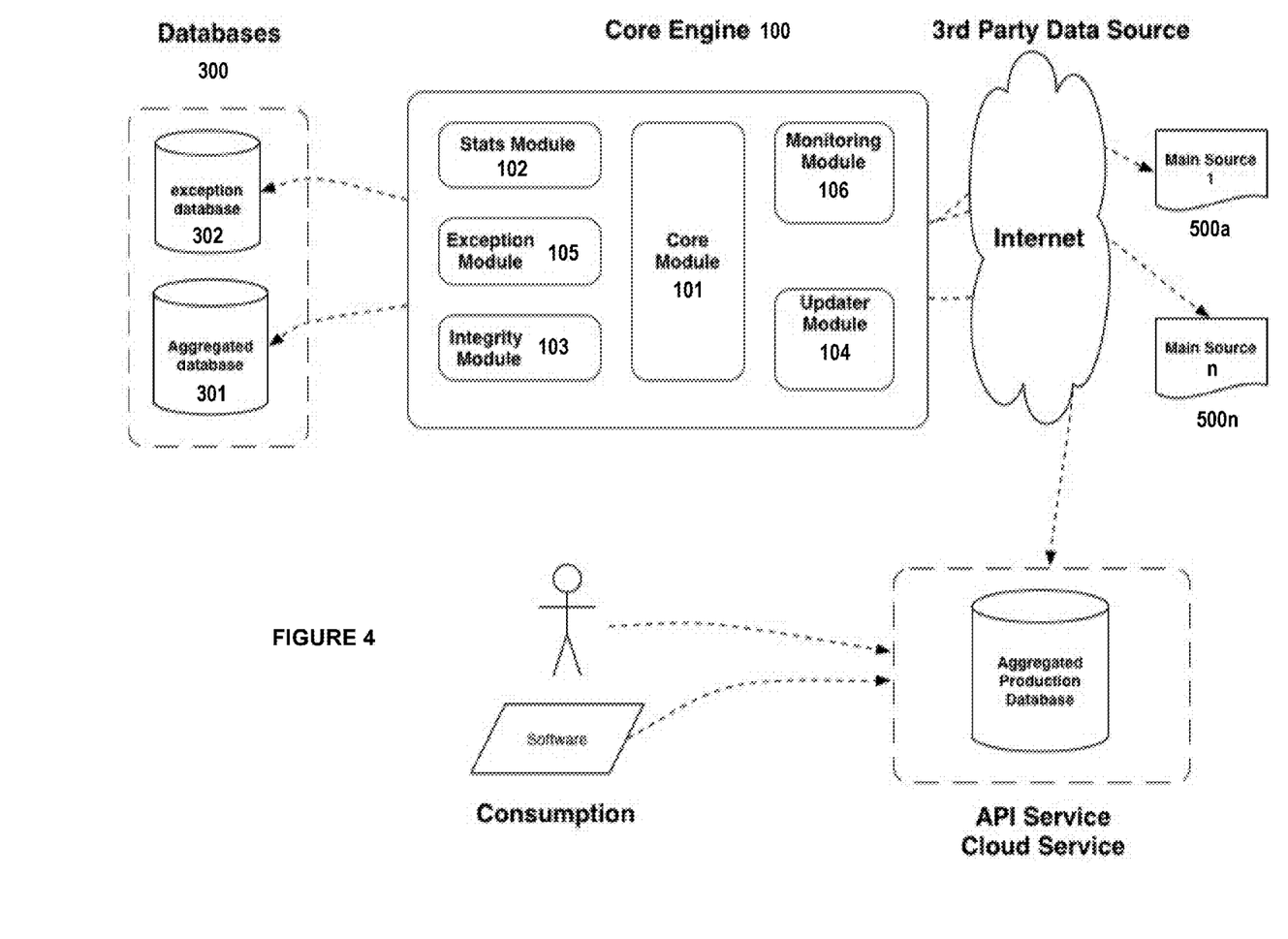
FIG. 4 is a block diagram expanding on the core engine showing the various modules and their interactions.

FIG. 4 shows the core engine (100) and its submodules in greater detail. The core module (101) is the central module of the core engine (100). It analyzes the main data sources (500), which are dictionaries of publicly known information security vulnerabilities and exposures, over the internet in order to initially populate the aggregated database (301) with vulnerability information. As contemplated, these main data sources comprise the NVD, CVE, CPE, CCE, CAPEC, OVAL, and CWE databases described above (represented in FIG. 4 as Main Sources 500a through 500n). Although these are the preferred main sources (500), the system could readily be extended to analyze other vulnerability databases that presently exist or may be developed in the future.

On startup, the core module (101) initializes and loads a configuration file, which contains links to the internet information sources. The core module (101) then transfers the link information to the updater module (104). After obtaining the files from the updater module (104), the core module (101) extracts basic attributes from the retrieved information and populates new entries into or updates the existing entries in the aggregated database (301). The core module (101) then calls the synchronizer module (201) in the mapper engine (200) to perform their routines.

The statistics module (102) generates statistics and indicators based on the information contained within the aggregated database (301). The statistics module (102) also keeps records on historical information and correlated attributes of the database entries. The statistic module (102) may also help to differentiate the updated version at any moment. The statistics module (102) interacts with the core module (101) to collect key information (e.g., date of update, total of CVEs, checksums, total of patches, total of scripts, latest added vulnerabilities) about the database then modifies the update manifest accordingly with date and database checksum information prior to its deployment using the updater module (104).

The integrity module (103) checks for environment integrity such as the existence of the databases (300), other core engine (100) modules, and mapper engine (200) modules. The integrity module (103) is also called to ensure the downloaded data from the internet reference sources are not corrupted. The integrity module (103) accomplishes this by calculating the checksums and comparing them with the appropriate ones published by the reference sources. The integrity module (103) also records any issue or error into the exceptions database (302).

The updater module (104) uploads the newest version of the database to the distribution platform (web service, cloud, server, virtual machine etc.). The updater module (104) also interacts with the monitoring module (203), integrity module (103) and exception module (105) to ensure that data is available and delivered without errors. The updater module (104) also downloads data from the internet information main sources. The various internet sources which this module obtains information from include, but are not limited to the CVE, CVSS, CPE, CCE, and CWE libraries.

The exception module (105) is responsible for highlighting and handling errors and exceptions that occur during the operation of the inventive method. The exception module (105) generates error, debug and exception information that is populated into the exception database (302) for further inspection and investigation. The exception module (105) is used by both the core engine (100) and the mapper engine (200). There are four error types generated by the exception module: debug, warning, error and critical exceptions.

The monitoring module (106) continuously tracks the third party source locations to ensure they are online and available for data and metadata to be downloaded by the updater module (104). If there is a problem with accessing one of the third party source locations, the monitoring module (106) will record an error in the exception database (302) regarding the discrepancy and its type. The monitoring module (106) interacts with the exception module (105) and integrity module (103) to ensure the data and connectivity are available throughout the process of collecting data from the reference sources.

In a preferred embodiment, the core engine (100) operates as follows. The core engine (100) is a software program written in Python programming language and including a set of Python libraries which is installed on a Unix (BSD) operating system. On start-up, the program loads into memory the various dependencies from the statistics module (102), all configuration sources, and their checksum source links. Following this, the core engine (100) starts its primary task which is to load the main source (500a-500n) entries which comprise the NVDCVE database from the internet. The NVDCVE database is the main repository for CVE entries. To accomplish this, the core engine (100) has a Python script called INIT.py which loads the configuration file CONFIG.py and extracts the attributes (source links and the checksums). Then the INIT.py script calls the updater module (104) to download the data feeds from the NVD-CVE database (from https://nvd.nist.gov/download.aspx). The attributes from the NVDCVE database include, but are not limited to: CVEID; title; issuing date; CVSS base score; CWE; CPE; and extra reference information. The core engine (100) then starts the integrity module (103) which validates the integrity of the downloaded data. The integrity module (103) reviews the downloaded files from the sources to identify any data that is inconsistent or may require reformatting prior to being populating into the aggregated database (301). If the integrity module (103) detects any inconsistent data it will raise an exception, stop executing, assign the error an error type, and warn the user. The user can then check the error and fix the error based on the assigned error type. The user evaluates the issue based on the error type and can decide whether to resume the task by skipping the error or can check the internet sources to modify the source links and correct the error. Once all exceptions are resolved the core engine (100) resumes the main task by populating the acquired information into the aggregated database (301). On final import, the core engine then calls the synchronizer module (201) of the mapper engine (200).

Figure 5:
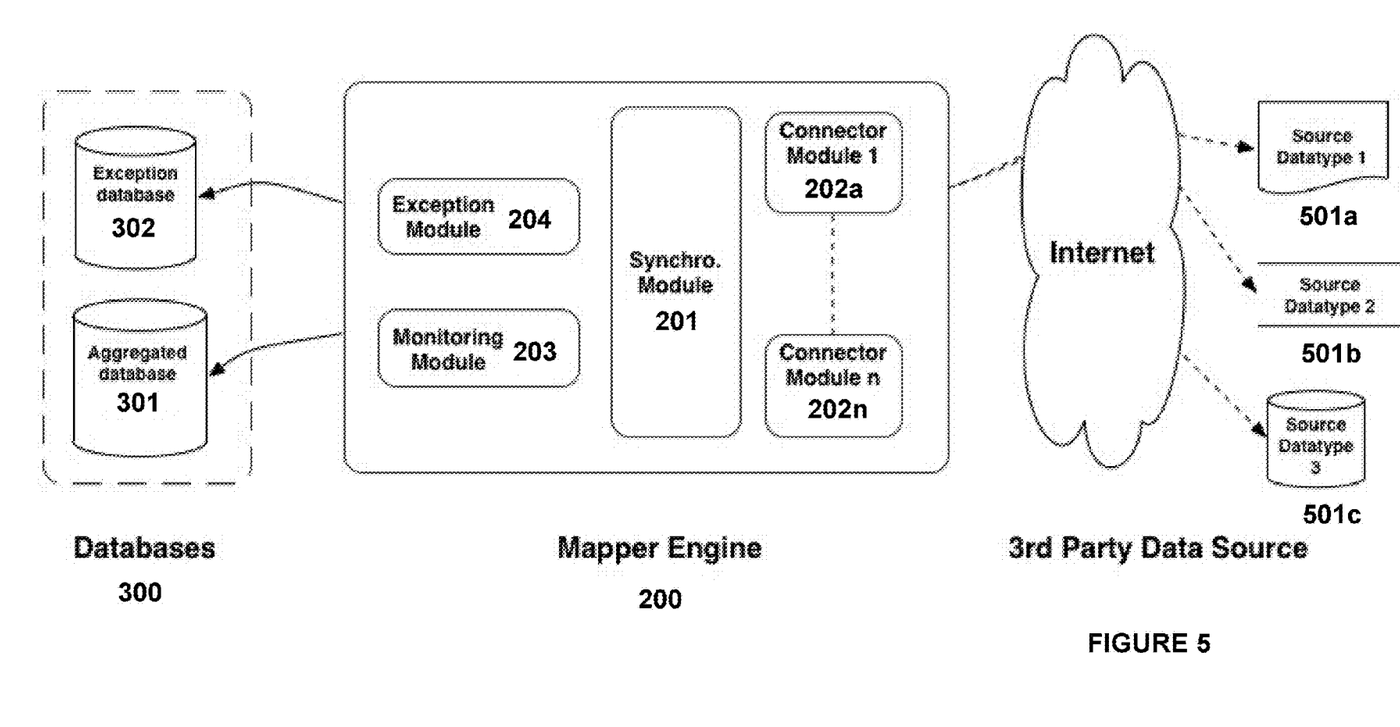
FIG. 5 is a block diagram expanding on the mapper engine showing the various modules and their interactions.

The mapper engine (200) comprises an auxiliary set of software libraries. It collects metadata (identifiers and attributes) and data for a vulnerability and corresponding preventive, detective and responsive information. The information is collected from various data source types and stored in the aggregated database (301). It performs this by extracting metadata from local and remote third party reference sources. The third party reference sources can constitute a wide variety of data formats and types such as XML files, HTML scripts and text files. The mapper engine (200) comes with a subset of modules described below.

The synchronizer module (201) coordinates the collection of metadata and data from the various connector modules (202). The synchronizer module (201) is launched by the core module (101) and accepts as input a file that contains the invention configuration and settings. The synchronizer module (201) is responsible to schedule the execution of the connector modules (202) in a certain order. It interacts with the exception module (105) to record any discrepancy or error during the collection process in the exception database (302). The synchronizer module (201) interacts with updater module (104) which downloads information updates associated with every connector module (202).

The connector modules (202) are initialized by the synchronizer module (201). They assess and the various data formats and types of the third party sources (501); extract the relevant attributes and identifiers; and update the aggregated database (301) with this information. The connector modules (202) interact with the exception module (105) and report any exceptions to the synchronizer module (201) for recording in the exception database (302). Each connector module (202) is responsible for checking a specific data source (e.g. hardware manufacturer/vendor sites, software manufacturer/vendor sites, and others) for additional information related to the vulnerabilities recorded in the aggregated database (301). The connector module then takes any such vulnerability information and integrates it into the respective entries for the relevant vulnerabilities in the aggregated database (301)

In a preferred embodiment, the mapper engine (200) operates as follows. The synchronizer module (201) reads the configuration file (CONFIG.py) and loads the configuration for each connector module (202a-202n). The parameters that are loaded in respect of each connector module (202a-202n) include, without limitation: script name, data source type, link to data source, and checksum which are relevant to the specific connector module (202a-202n). The synchronizer module (201) then calls the updater module (104) which then uses the data source links and checksum to instruct the modules to obtain the data source feeds. Then the updater module (104) calls the integrity module (103) to validate the data downloaded from the internet sources for integrity. In the event of inconsistent data, the monitoring module (203) and exception module (204) will identify and record the error for user review. Once the integrity test is passed, the integrity module (103) passes the process to the synchronizer module (201) which starts the connector module (202a-202n) scripts. Once the information is loaded, the synchronizer module (201) will launch the appropriate connector module (202a-202n) with each module's respective settings. This process is repeated sequentially for each connector module (202a-202n). The connector module (202a-202n) for each information source type (501a-501c) then reads into the obtained data source feed and extracts the extra information related to that data source. If a particular connector module (for example, 202a) obtains the data feed ID for the Nessus vulnerability scanner, it will take the Nessus ID, Nessus scanning script file, Nessus title, and the CVE for the data entries within that feed. For each CVE found in the Nessus data source, the connector module (202a) will populate the aggregated database (301) with the extended information acquired from the Nessus vulnerability scanner data source. This same process will repeated for the subsequent connector modules (202b-202n). This arrangement allows for connector modules (202a-202n) to be added or deleted as data sources change over time.

The method and system use two main databases (300): the aggregated database (301); and the exception database (302).

The aggregated database (301) is a structured relational database where the data and metadata related to the vulnerability, exposure and their corresponding preventive, detective and response information are stored. The aggregated database (301) is organized based on a hierarchical model. The tree-like structure has multiple tables and tuples to align with the large collection of third party reference datasets.

The exception database (302) is used to store the generated errors, debug and exceptions alongside their respective metadata encountered during inter-modular interaction. The exception database (302) is for internal use only.

Figure 6:
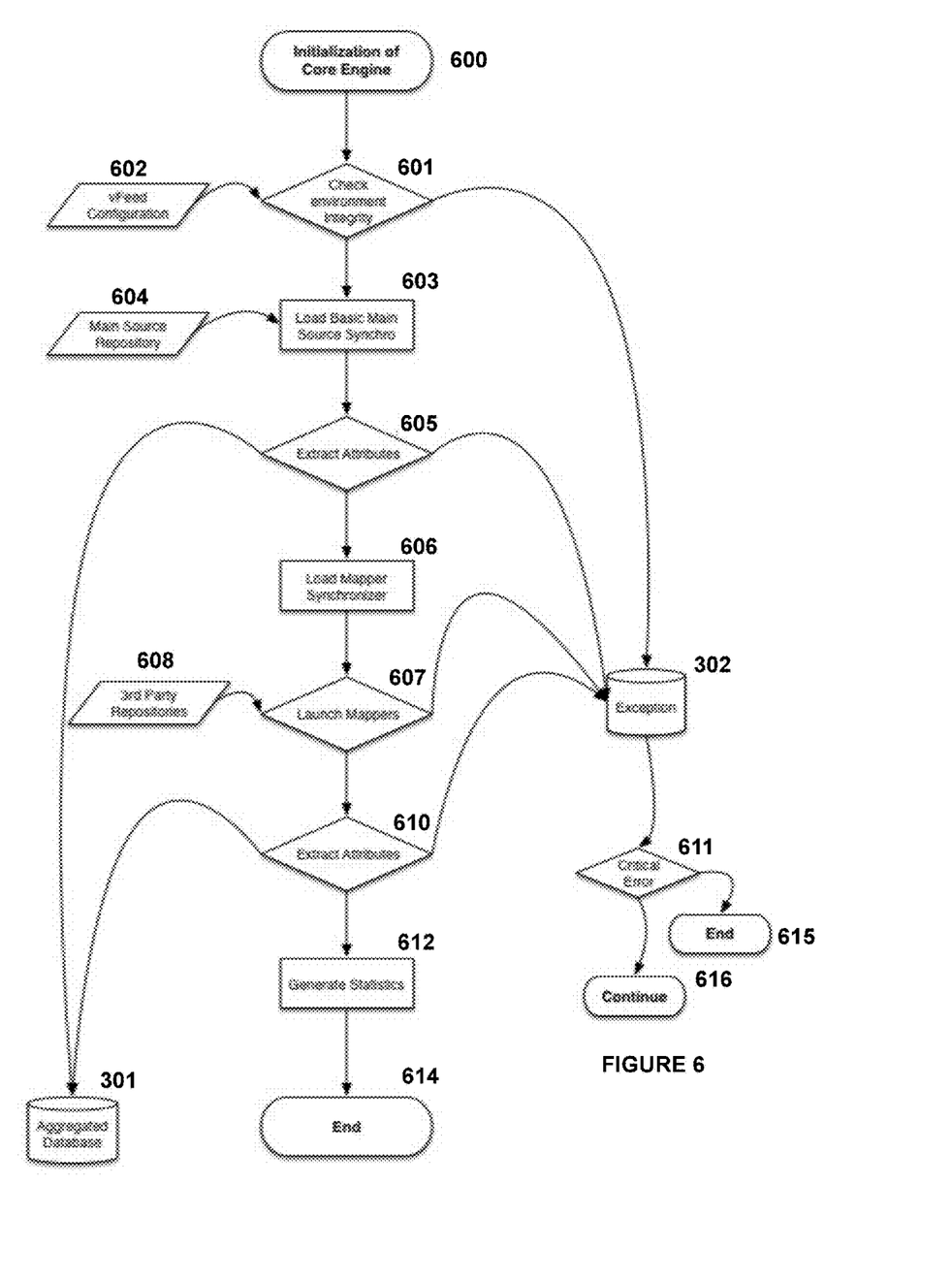
FIG. 6 is a flow diagram describing the process in which the various engines and modules collect, map and populate the aggregated vulnerability database.

As depicted in FIG. 6, the method or system of the invention operates according to the following process. The core engine (100) initializes the core module (101) either manually or automatically and begins its initialization process (600). This initialization process reads the configuration file (602) which contains links to data sources, internet links, internet file signatures, module names and hashes, and database hashes. The core module (101) then calls the updater module (104) which takes the internet links from the configuration file (602) to the main and third party data sources, signatures, and hashes and downloads the associated vulnerability data. The core engine (100) then calls the integrity module (103) into memory to validate the integrity of the downloaded information using checksums (601). At this, and each subsequent step, the exception module (105) is called to determine if errors exist and, if so, those errors are recorded in the exception database (302). The exception database (302) records the error, its error type, and severity. Based on the severity of the error (611) the program either continues (616) or is exited (615). The error and debug information stored in the exception database (302) can then be referenced for troubleshooting the system (program maintenance).

The core module (101) continues its next process which is the extraction of the basic attributes (603) (ID, description, date of release, vectors, type of targets and weaknesses) of the downloaded data from the main data information sources (including CVE, CPE, CWE, CVSS, and the other main sources referenced above) (604). The core module (101) then updates the aggregated database (301) with these attributes (605). The core module (101) then loads the synchronizer module (201) (606). The synchronizer module (201) then calls each connector module (202) sequentially (607). Each connector module (202) will extract attributes from its assigned third party source (608) and update the aggregated database (301) with the extracted attributes (610).

The synchronizer module (201) then calls the statistics module (102) which then reads into the aggregated database (301), computes statistical information and rewrites indicators into a statistics table in the aggregated database (301) (612). Once this process terminates without a critical error (614), the statistics module (102) then recalls the core module (101) which packages the aggregated database (301) for distribution purposes. The aggregated database (301) is distributed by calling the updater module (104) which uploads the aggregated database (301) to an internet facing computer server for distribution to customers and end users. The core module (101) also generates a manifest file with update information also uploaded for distribution.

The invention introduces a new normalized extensible XML-based schema concept that provides structured and detailed technical characteristics for vulnerability, exposure and their corresponding preventive, detective and response information (vulnerability metadata).

The XML-based vocabulary syntax describes vulnerability metadata in such a way, it can be consumed as input by security resources and third party tools to significantly reduce the effort required to render the aggregated data. The XML-based schema provides a method to store and exchange a CVE and its related vulnerability metadata in a new normalized format. It has been structured to be extensible and has a comprehensive set of attributes designed to describe the main aspects of vulnerability metadata. As such, any product, standard, tool or document reference that crosslinks its identifier with a CVE can extend vulnerability metadata as part of its own data representation.

Figure 7:
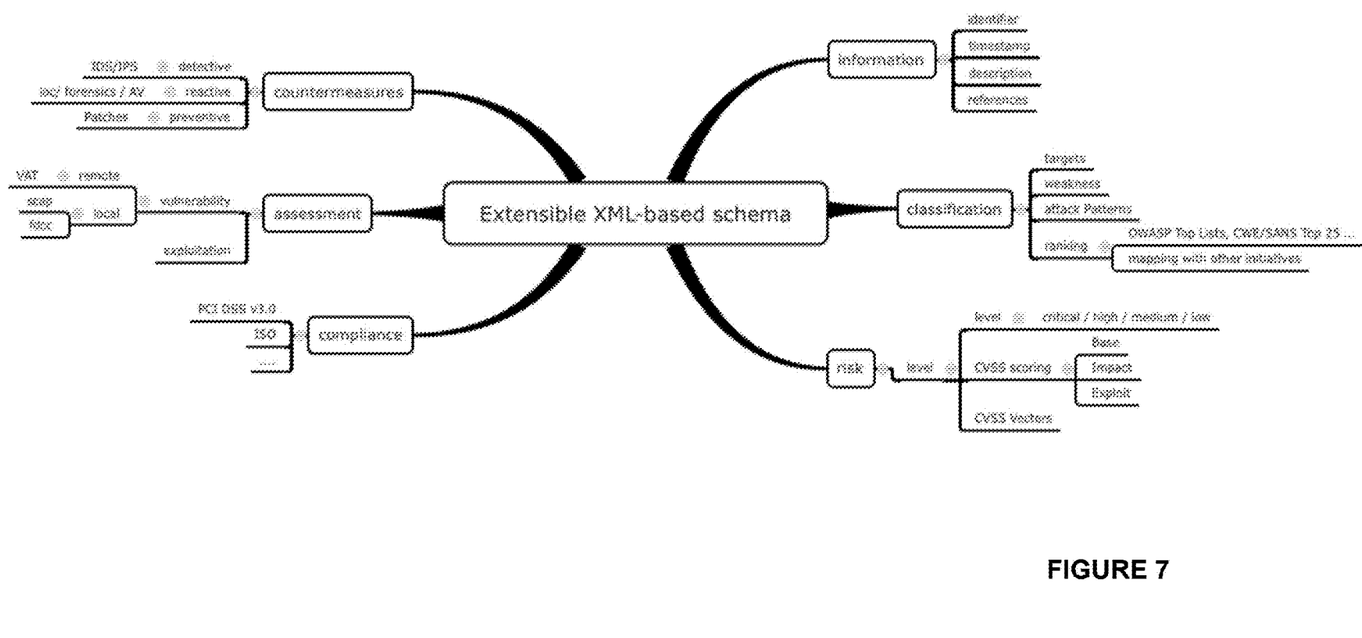
FIG. 7 illustrates the new standardized XML schema introduced showing the various data categories represented in the XML.

Without this XML-based schema researchers and security tools will lack a method to effectively represent the consolidated vulnerability metadata which exists in the aggregated database (301). As shown in FIG. 7, the XML-based schema is based around classifying the information around six key attributes:

Information: this attribute describes the basic information of the vulnerability such as the summary of the vulnerability, the timestamp and the references. The identifier is a unique ID associated with every CVE. The timestamp is a tuple of information related to the date of the release and modification of the vulnerability. The references comprise third party mentions of the CVE.

Classification: this attribute describes the targets, type of weakness, attack patterns and ranking of the vulnerability.

Risk: this attribute describes a calculated risk level based on CVSS scoring initiative.

Countermeasures: this attribute details information related to the detective, reactive and preventive metadata.

Assessment: this attribute represents the information related to a vulnerability detection and exploitation metadata.

Compliance: this attribute represents information related to relevant regulations associated with vulnerability metadata.

Example

As an example, upon initialization the core module (100) searches the main sources (500) for known vulnerabilities and returns a list of CVE vulnerability identifiers with their associated CVSS base scores and description information. For each of these identified vulnerabilities, the system searches the CWE entries for that vulnerability and records the categories of attack for that vulnerability. The core module (100) then acquires the full CVSS risk scores and OVAL testing scripts associated with that vulnerability. Additional information from the main sources (500) may also be compiled into the database entry for that vulnerability as appropriate.

Using the information acquired from the main sources (500) the system then activates the mapper engine (200) and uses the connector modules (202) to search third party sources (501) for information related to the identified vulnerabilities. Examples of this information include hardware or software patches, attack scripts, defense signatures, information disclosures, etc. After the mapper engine (200) has compiled this information for a given vulnerability the core module (100) compiles the information for each vulnerability in a computer readable format according to the XML-based schema.

The output XML file provides a breakdown of the collected information sorted by the attributes of the XML schema. This sorts the collected information according to whether it contains: basic information about the vulnerability; classification of the target, weaknesses, and attack patterns, and rankings; risk level of the vulnerability; detective, reactive, and preventive countermeasures; assessment of the vulnerability and exploitation nature; and compliance of the metadata. Each of the entries in these categories and subcategories classify the information by attributes specific to the category or subcategory, such as the source of the information and the class of the information. This categorization schema allows for the information to be easily understood by a reviewer while also allowing for automated review of the vulnerability on the basis of the categories and attributes.

While the foregoing describes most preferred embodiments of the subject invention, a person skilled in the art will appreciate that variations of such embodiments will be feasible and still be within the scope of the teachings herein. Thus, the substitution of different main and third party data sources for those specifically indicated may be expected to occur to such person, and variations in configurations may be made while sustaining the functions of components described herein. As such, all such changes are considered to be within the intended scope of the present invention.

The invention claimed is:

1. A computer implemented method of tracking, compiling, and distributing information regarding computer vulnerabilities, the method comprising:
   identifying, with a processor, one or more computer vulnerabilities from one or more internet main sources, and storing one or more types of main information regarding each of the one or more computer vulnerabilities;
   searching one or more internet secondary sources, with the processor, for one or more types of secondary information regarding each of the one or more vulnerabilities, and storing said secondary information;
   compiling an electronic database with database entries cross-referencing each of the one or more computer vulnerabilities with the main information and secondary information regarding that vulnerability;
   creating a computer readable file for each database entry which provides summary data regarding the main information and secondary information regarding that vulnerability; and
   distributing the electronic database via the internet,
   further comprising searching the one or more internet main sources and one or more internet secondary sources for updated main information and updated secondary information regarding each previously identified vulnerability and updating the database entries to include the updated main information and updated secondary information.

2. The method of claim 1, wherein the one or more internet main sources are selected from the group consisting of: the Common Vulnerability Exposure (CVE) library; Common Configuration Enumeration (CCE) library; Common Platform Enumeration (CPE) library; Common Vulnerability Scoring System (CVSS) library; National Vulnerability Database (NVD) library; and combinations thereof.

3. The method of claim 1, wherein the one or more types of main information are selected from the group consisting of: vulnerability descriptions; target classification; target weakness; vulnerability attack patterns; vulnerability rankings; vulnerability risk level; vulnerability detection; vulnerability response; vulnerability prevention; vulnerability exploitation; regulations associated with the vulnerability; and combinations thereof.

4. The method of claim 1, wherein the internet secondary sources are selected from the group consisting of: software manufacturer websites; hardware manufacturer websites; third party security resources, and combinations thereof.

5. The method of claim 1, wherein the computer readable file for each database entry is created according to an extensible XML-based schema which incorporates technical details of the vulnerability database entry into categories and subcategories of the computer readable file.

6. A non-transitory computer readable medium for tracking, compiling, and distributing information regarding computer vulnerabilities, comprising instructions thereon, that when executed on a processor, perform the steps of the method of claim 1.

7. A system for tracking, compiling, and distributing information regarding computer vulnerabilities, the system comprising:
 a processor, for identifying one or more computer vulnerabilities and one or more types of main information regarding each of the one or more computer vulnerabilities from one or more internet main sources, and searching one or more internet secondary sources, for one or more types of secondary information regarding each of the one or more vulnerabilities;
 a memory storage, for storing the identifies vulnerabilities, the one or more types of main information, and the one or more types of secondary information;
 wherein storing the identified vulnerabilities, the one or more types of main information, and the one or more types of secondary information consists of:
 compiling the identified vulnerabilities, the one or more types of main information, and the one or more types of secondary information in an electronic database with database entries cross-referencing each of the one or more computer vulnerabilities with the main information and secondary information regarding that vulnerability; and
 creating a computer readable file for each database entry which provides summary data regarding the main information and secondary information regarding that vulnerability; and
 wherein the processor distributes the electronic database via the internet; and
 wherein the processor is further configured for searching the one or more internet main sources and one or more internet secondary sources for updated main information and updated secondary information regarding each identified vulnerability and updating the database to include the updated main information and updated secondary information.

8. The system of claim 7, wherein the one or more internet main sources are selected from the group consisting of: Common Vulnerability Exposure (CVE) library Common Configuration Enumeration (CCE) library; Common Platform Enumeration (CPE) library; Common Vulnerability Scoring System (CVSS) library; National Vulnerability Database (NVD) library; and combinations thereof.

9. The system of claim 7, wherein the one or more types of main information are selected from the group consisting of: vulnerability descriptions; target classification; target weakness; vulnerability attack patterns; vulnerability rankings; vulnerability risk level; vulnerability detection; vulnerability response; vulnerability prevention; vulnerability exploitation; regulations associated with the vulnerability; and combinations thereof.

10. The system of claim 7, wherein the one or more internet secondary sources are selected from the group consisting of: software manufacturer websites; hardware manufacturer websites; third party security resources, and combinations thereof.

11. The system of claim 7 wherein the computer readable file for each database entry is created according to an extensible XML-based schema which incorporates technical details of the vulnerability database entry into categories and subcategories of the computer readable file.

* * * * *